(12) United States Patent
Compton et al.

(10) Patent No.: US 7,702,545 B1
(45) Date of Patent: Apr. 20, 2010

(54) SYSTEM AND METHOD FOR FACILITATING EXCHANGES BETWEEN BUYERS AND SELLERS

(75) Inventors: J. Benjamin Compton, Seattle, WA (US); Jeffrey N. Peterson, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 381 days.

(21) Appl. No.: 11/331,255

(22) Filed: Jan. 12, 2006

Related U.S. Application Data

(60) Provisional application No. 60/715,255, filed on Sep. 8, 2005.

(51) Int. Cl.
*G06F 17/30* (2006.01)
(52) U.S. Cl. .......................................... 705/27; 705/26
(58) Field of Classification Search ................... 705/27, 705/26
See application file for complete search history.

(56) References Cited

U.S. PATENT DOCUMENTS

| | | | | |
|---|---|---|---|---|
| 2002/0143655 | A1* | 10/2002 | Elston et al. | 705/26 |
| 2003/0004743 | A1* | 1/2003 | Callegari | 705/1 |
| 2004/0023666 | A1* | 2/2004 | Moon et al. | 455/456.1 |
| 2004/0133446 | A1* | 7/2004 | Myrick et al. | 705/1 |
| 2005/0097005 | A1* | 5/2005 | Fargo | 705/26 |
| 2006/0069627 | A1* | 3/2006 | Petersen et al. | 705/27 |
| 2008/0059329 | A1* | 3/2008 | Luchene et al. | 705/26 |

OTHER PUBLICATIONS

Nah et al.; "Knowledge management mechanisms in e-commerce: A study of online retailing and auction sites," The Journal of Computer Information Systems, 2002; v42i5pg119; Proquest #179177381, 18pgs.*
Beckett, Jamie; "Personal technology/ rise of the online middlemen/ escrow services in demand as net auction sites proliferate," San Francisco Chronicle, Jan. 14, 1999, Proquest #38035765, 5pgs.*
Krivda, Cheryl; "Putting the pieces together for e-commerce," Optometric Management, Mar. 2000, v35i3pgE14, Proquest #51905628, 5pgs.*
Kotas, Paul et al., U.S. Appl. No. 10/750,331; filed Dec. 31, 2003, entitled "Using Theme-Based Item Groupings to Facilitate Item Selection," 51 pages.
"eBay's Stealthy New Classified Ads Site," BusinessWeek Online, Mar. 8, 2005, retrieved Oct. 10, 2007, from http://www.businessweek.com/the_thread/techbeat/archives/2005/03/ebays_stealthy.html, 1 page.
http://www.flickr.com, retrieved May 26, 2005, 1 page.
"Listmania Lists," Amazon.com, retrieved May 26, 2005, from http://www.amazon.com/exec/obidos/tg/browse/-/542566/qid=1117129438/sr=53-1/ref=tr_10054..., 2 pages.

(Continued)

*Primary Examiner*—Robert M. Pond
(74) *Attorney, Agent, or Firm*—Seed IP Law Group PLLC

(57) ABSTRACT

A method and system facilitates the exchange of goods and services at a local level. For each party, information is received including an indication of one or more items desired to be exchanged and an indication of one or more exchange locations acceptable to the party. Potential matches are identified by identifying exchange locations that are mutually agreeable to respective ones of the parties involved in a given exchange.

43 Claims, 10 Drawing Sheets

OTHER PUBLICATIONS http://en.wikipedia.org/wiki/Main_Page, retrieved May 26, 2005, 3 pages.
http://del.icio.us/, retrieved May 26, 2005, 6 pages.
http://www.craigslist.com/, retrieved May 26, 2005, 1 page.
http://www.paulrademacher.com/housing/, retrieved May 26, 2005, 1 page.
http://www.windermere.com/index.cfm?fuseaction=Listing.SearchPropertyMap&HIDDENSFTY..., retrieved May 26, 2005, 1 page.

* cited by examiner

1. My Items for Sale

Click an item description to make changes to that item or to remove it from your list of items for sale. /712

| Description | Item Type | Catalog Item Number /716 | Price /718 | Picture? /719 |
|---|---|---|---|---|
| Beethoven Symphony No. 5 | Music CD | CD003996840 | $x | No |
| Best Animation Special #6 | DVD Movie | DM209845884 | $x | Yes |
| 16-inch girl's bicycle, pink with white seat | Bicycle-Child's | - | $x | Yes |
| History of Washington State, Author: J. Thomason | Book - Hardcover | BK300457984 | | No |

/714

}  /710

2. Add New Items for Sale

Enter the details for each item. Alternately, you may click the Catalog Item Number to select the item from the product catalog, linking the item for sale to that catalog item and populating the item Description and Item type. /722

| Description | Item Type | Catalog Item Number /726 | Price /728 | Picture /729 |
|---|---|---|---|---|
| | <select>▼ | <click to add> | <click to add> | <click to add> |
| | <select>▼ | <click to add> | <click to add> | <click to add> |
| | <select>▼ | <click to add> | <click to add> | <click to add> |

SYSTEM AND METHOD FOR FACILITATING EXCHANGES BETWEEN BUYERS AND SELLERS

CROSS-REFERENCE TO RELATED APPLICATIONS

This application is an application claiming the benefit under 35 USC 119(e) of U.S. Prov. Pat. App. 60/715,255, filed Sep. 8, 2005, entitled "System and Method for Facilitating Exchanges Between Buyers and Sellers," incorporated herein by reference in its entirety.

BACKGROUND

Individuals often have items which they no longer want but which are in good enough condition that they do not need to be thrown away. Other individuals may be motivated to purchase such second-hand items because they are in good condition and because they can be purchased second-hand at a price which may be substantially less than that which would be paid for the same item purchased new. The item, though not brand new, may still have significant useful life left in it.

Various forums have been developed to facilitate exchanges between buyers and sellers of second-hand items. For example, individuals may accumulate items they wish to sell and then hold a garage sale. Likewise, classified advertisements have been used to allow sellers to place an advertisement for their second-hand items according to a classification scheme developed by the newspaper (or other media) that hosts the classified advertisement.

With the advent of the Internet, various additional forums have been developed that facilitate exchanges between buyers and sellers of second-hand items. For example, on-line auction sites have been developed in which sellers may make items available in an auction format to buyers, and buyers are allowed to place bids on the items being sold. Likewise, on-line classified advertisement forums have been developed that are similar to classified advertisement forums found in non-Internet media, such as newspapers.

In general, for any forum that attempts to bring together buyers and sellers of second-hand items, an ongoing challenge is to make the exchange as simple, and easy as possible for all parties involved. From the standpoint of the seller, if too much time and effort is required to find an interested buyer, the seller may simply decide to throw away its unwanted item. From the standpoint of a buyer, if too much time and effort are required to find second-hand items, the buyer may decide to buy what it needs new.

An ongoing need exists for systems and methods that facilitate the exchange of items between buyers and sellers. It should be noted that, while certain advantages and features are described, the teachings herein may be used to implement systems and methods that do not have any of the advantages and features, but rather which have other advantages and features.

SUMMARY

One embodiment relates to a method for facilitating exchanges of items. The method comprises receiving information from potential sellers of the items and from potential buyers of the items. For each potential seller, the information comprises an indication of one or more items desired to be sold and an indication of one or more exchange locations acceptable to the potential seller. Likewise, for each potential buyer, the information comprises an indication of one or more items desired to be purchased and an indication of one or more exchange locations acceptable to the potential buyer. The information is stored in a database and processed to identify potential matches between the potential buyers and the potential sellers. The potential matches are identified at least in part by identifying exchange locations that are mutually agreeable to respective ones of the potential buyers and the potential sellers.

Another embodiment relates to a method for facilitating the exchange of items. The method comprises receiving information from users including (1) an indication of one or more items desired to be exchanged and (2) an indication of one or more exchange locations acceptable to the users. The method further comprises providing the users with information concerning items that (1) match filter criteria defined by the users and (2) are available to be exchanged at one of the exchange locations which is mutually acceptable to another one of the users with whom the exchange is to be conducted. Interactive screen displays are provided to the users by way of the Internet. The interactive screen displays are configured to provide the potential users with information regarding the one or more items desired to be exchanged.

Another embodiment relates to a method for facilitating the exchange of items. The method comprises receiving information from potential sellers and buyers of the items. For each potential seller, the information comprises an indication of one or more items desired to be sold and an indication of one or more exchange locations acceptable to the potential seller. Likewise, for each potential buyer, the information comprises an indication of one or more items desired to be purchased and an indication of one or more exchange locations acceptable to the potential buyer. The information received from the potential buyers and the potential sellers is stored in a database. An on-line product catalog is accessed to obtain information regarding at least some of the items desired to be sold by the potential sellers. The potential buyers are provided with the information obtained from the on-line product catalog. The information in the database is processed to identify potential matches between the potential buyers and the potential sellers. The potential matches are identified at least in part by identifying exchange locations that are mutually agreeable to respective ones of the potential buyers and the potential sellers.

BRIEF DESCRIPTION OF THE DRAWINGS

FIG. 7 is a screen display provided by the system of FIG. 1 in which items that a user has listed for sale are displayed;

DETAILED DESCRIPTION OF EXEMPLARY EMBODIMENTS

Figure 1:
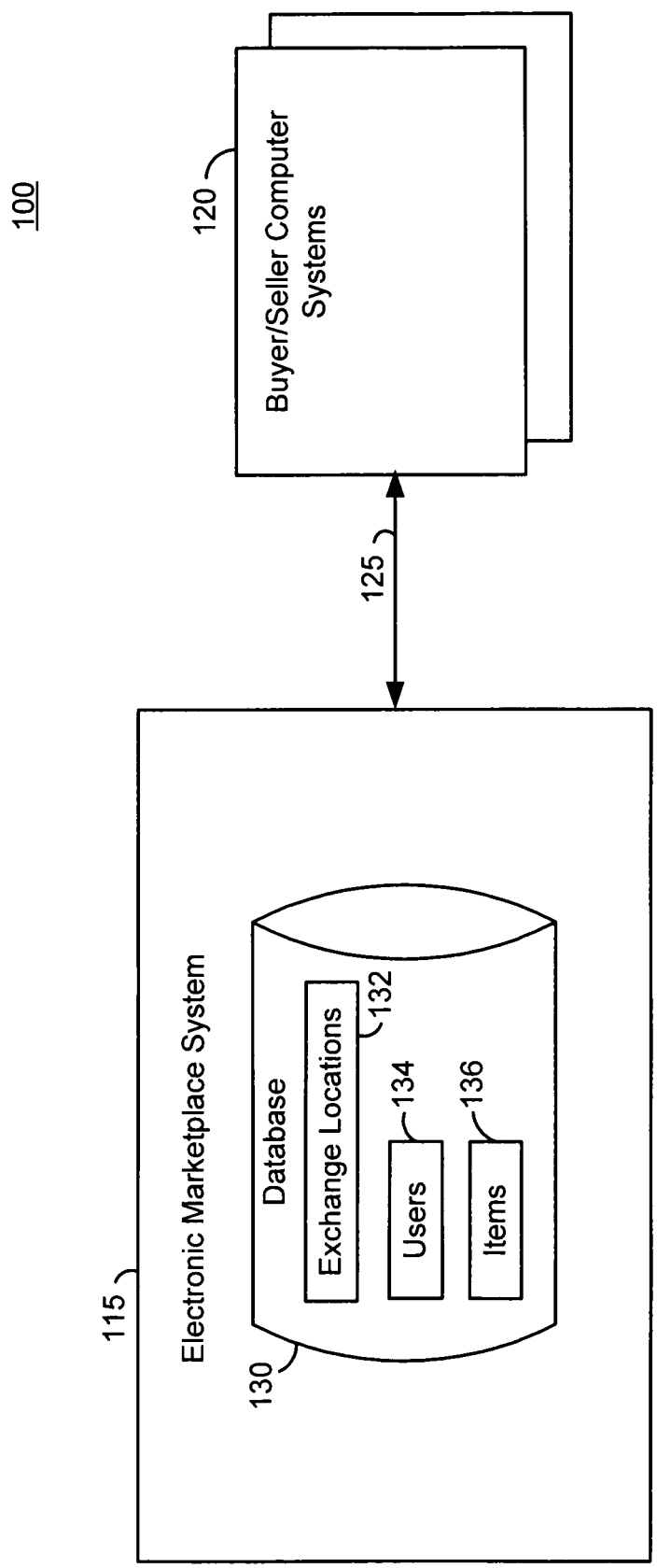
FIG. 1 is a block diagram of an electronic marketplace according to an exemplary embodiment.

Referring now to FIG. 1, a system 100 according to an exemplary embodiment is shown. System 100 includes an electronic marketplace system 115 and a plurality of computer systems 120 used by buyers and sellers. The marketplace system 115 may be implemented on one or more host computers and may be accessible to the computer systems 120 by way of a network, such as the Internet. The marketplace system 115 further comprises a database 130 which stores exchange location information 132, item information 134, and user information 136.

In an exemplary embodiment, buyers and sellers are permitted to designate exchange locations in the system 100. An exchange location may be a location that the user regularly visits. For example, users may designate locations such as health clubs, schools, coffee shops, book stores, and so on, as acceptable exchange locations. Such exchange locations may be considered by the user to be a location that the user would agree to visit in order to conduct an exchange of a second-hand item. In one embodiment, system 100 provides users with a list of available exchange locations from which to select. Such exchange locations may be local businesses that have elected to allow their premises to serve as exchange locations, for example, in order to increase customer traffic. Database 130 may maintain information concerning items that users have for sale, items that users wish to purchase, and the exchange locations selected by each of the users. This information may then be used to identify matches between users. For example, for a particular seller that has an item it wishes to sell, system 100 may facilitate finding a suitable buyer that visits the same exchange locations as the seller. The seller may perform a search for buyers that wish to purchase the item, for example, by searching for buyers that are interested in purchasing the item and then filtering the results based on exchange locations (e.g., to determine whether any of the buyer's exchange locations are agreeable to the seller, regardless whether the seller has previously designated the exchange location as being one of its preferred exchange locations). Likewise, a buyer that wishes to purchase an item may search for sellers that are interested in selling the item and then filter the results based on exchange locations. As another example, buyers and sellers may perform the initial filtering based on exchange locations, e.g., to browse their preferred exchange locations and then view the items that others wish to buy or sell at those exchange locations. As another example, sellers and buyers may post items on for-sale lists or watch lists to see if any potential buyers or sellers express interest in buying or selling the item, respectively. Once a match has been identified, the buyer and seller may then complete the transaction at the exchange location, allowing an in-person exchange to occur which allows the buyer to inspect the item prior to the purchase and which allows the seller to avoid having to pay shipping costs.

As described in greater detail below, the computers 120 may be used by buyers and sellers to register with the system 115, to select exchange locations, to provide information regarding items that the user desires to sell and/or items that the user desires to purchase, and so on. In an exemplary embodiment, computers 120 may employ Internet browsers to connect with the marketplace system 115. In exemplary embodiments, the computers 120 may comprise personal computers, portable handheld devices (e.g., cellular telephones, PDA devices, portable e-mail devices), and other types of devices enabling users to view, edit, or otherwise access the information contained in the marketplace system 115. Some embodiments may include other systems in addition to or in place of the browser and allowing the user to interact with the client computer system.

Figure 2:
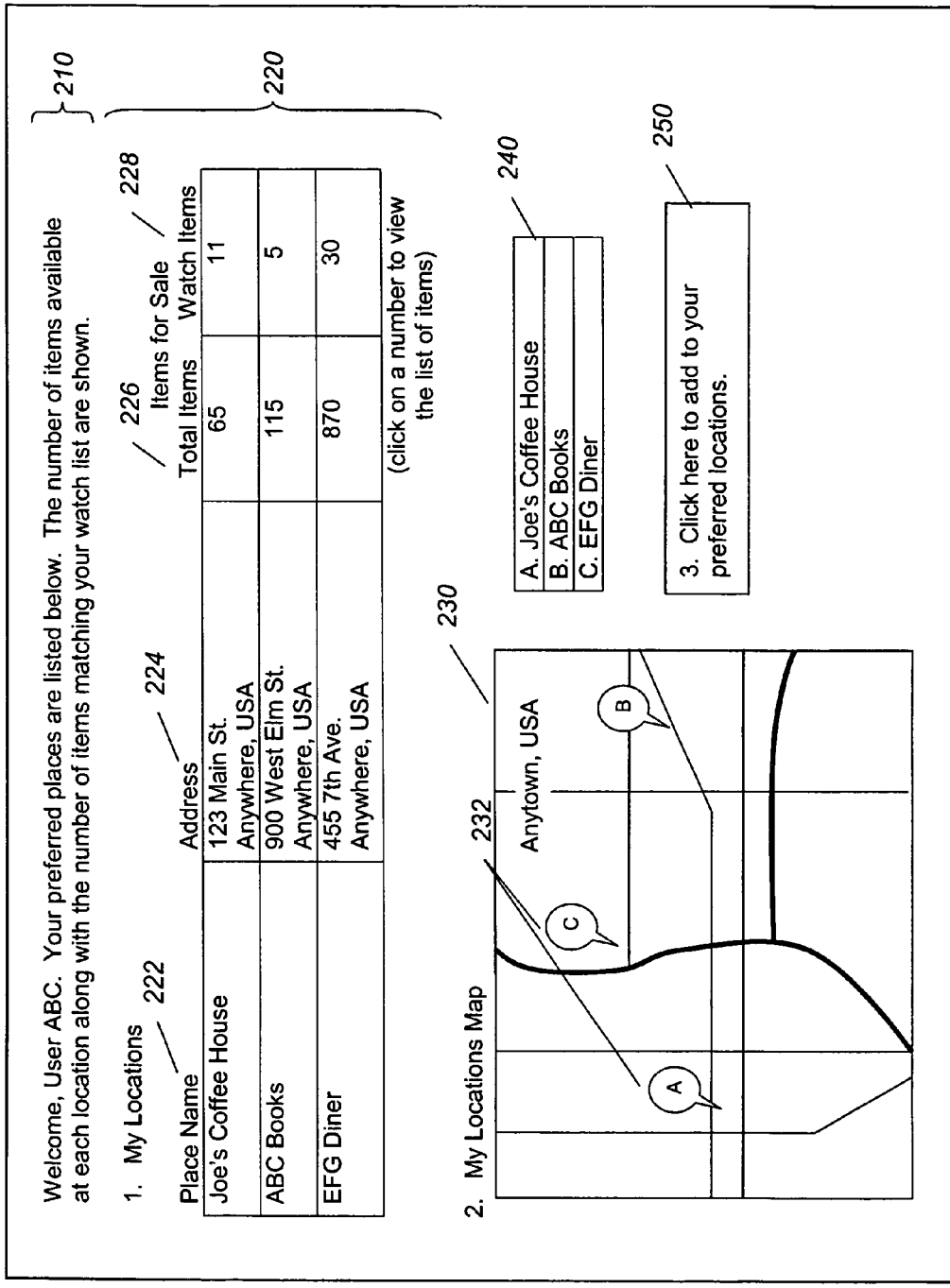
FIG. 2 is a screen display provided by the system of FIG. 1 in which a user's preferred local exchange locations are displayed.

FIG. 2 is an exemplary interactive screen 200 which allows potential buyers, potential sellers, and other users (generically referred to as "users") of the marketplace system 115 to select or otherwise specify particular physical locations where the user prefers to inspect, exchange, or conclude the purchase or sale of goods or services. As previously indicated, by selecting a set of exchange locations, a seller indicates to potential buyers that the seller is willing to allow for inspection of the goods and complete the sale at one of the specified locations. Similarly, a potential buyer may filter the list of available items for sale or exchange based upon the buyer's exchange locations, thereby limiting the buyer's search to items available for sale or exchange at those specific, mutually agreeable locations. For example, a user's selected exchange locations may be locations the customer frequently visits such as a coffee shop, book store, health club, office, school, and so on. This may be useful, for example, where the potential buyer wishes to browse the items to see what is available for sale at its preferred exchange locations. A potential buyer may also filter the list of available items for sale to search for a particular item of interest. Having found one or more sellers that wish to sell the item of interest, the potential buyer may then view the exchange locations at which the item is available to determine whether any are agreeable to the potential buyer. In generally the same manner, a potential seller may also be permitted to filter based on items in watch lists and then exchange locations, or based on exchange locations and then items in watch lists.

Screen 200 displays a welcome message along with a description of what is displayed at region 210. Screen 200 also displays a list of exchange locations selected by the user, referred to as "My Locations," at region 220. For each exchange location listed, additional information is provided including the name of the exchange location (column 222), the exchange location address (column 224), the total number of items for sale at the exchange location (column 226), and the number of items that match the user's specified criteria of items the user is interested in purchasing (column 228). In column 228, the items a user is interested in purchasing is referred to as the user's "watch items."

As previously indicated, in an exemplary embodiment, users may be permitted to select exchange locations from a default list of available exchange locations. The exchange locations on the default list may comprise local businesses that have agreed to allow their premises to serve as exchange locations. Such businesses may, for example, provide an indication (e.g., a window sticker) of such participation at the physical premises of the exchange location.

In an exemplary embodiment, in addition to agreeing to allow buyers and sellers to meet at the exchange location, such businesses may further agree to act as an escrow service for the sale of some items. For example, when a buyer notifies a seller of the buyer's interest, the buyer and seller may agree on the exchange location. The seller may then deposit an item to be sold at the sponsor business and include information such as item number and price. The business may then hold the item until purchased by a buyer for the set price or until a predetermined amount of time has passed, at which time the seller is required to retrieve the item. The buyer may visit the local exchange location at the buyer's leisure to inspect the goods and purchase the goods directly, without the need for the seller being present. System 115 may also be configured to display a list of previous transactions conducted at a particular exchange location. The information may be used to refresh the recollection of the user as to whether the user has conducted any previous transaction at the exchange location, and thereby assist the user in deciding whether the user is comfortable using the user exchange location as an escrow service. System 100 may also be configured to maintain other information concerning exchange locations relevant to their ability or willingness to serve as an escrow service in connection with a particular item. For example, system 115 may include configurable business rules logic accessible by the exchange locations to specify its escrow service policies, e.g., relating to parameters such as item size, item weight, number of items for a particular user, and so on. In the context of a particular transaction, the rules logic may then be automatically applied to determine whether the transaction meets the policies specified by the exchange location and an appropriate notification may be provided to the buyer and seller. In an exemplary embodiment, the exchange location may also charge a fee in connection with the transaction. For example, the exchange location may charge a transaction fee to the seller for serving as an escrow service in connection with the transaction. The transaction fee may be charged as a percentage of the total value of the transaction and is charged contingent upon completion of the transaction. The transaction fee may also be charged regardless whether the transaction is completed, such as in the form of an advertising fee. Such information may be stored in the database 130 (or in another database) and provided to buyers and sellers considering using the exchange location as an escrow service. For example, the buyers and sellers may be provided with messaging describing standard fees charged by the exchange location in connection with serving as an escrow service.

Screen 200 also displays a graphical map 230 of an area that includes the user's selected exchange locations. The map contains icons 232 which show the locations of the user's selected exchange locations relative to other features on the map. The graphical display of locations may include icons of different shape, icons of different color, and so on. Additionally, other arrangements may also be used to display which locations have items listed for sale and which locations have items for sale matching the user's items of interest. Other details regarding the local exchange locations may also be displayed, such as the telephone number, hours of operation, whether the location is willing to act as an escrow service, and so on. Also shown is a map legend 240 indicating which exchange location is related to a specific icon as displayed on the map.

The user may be presented with a hyperlink button 250 providing the option to add new locations to the user's exchange locations. In the illustrated example, User ABC has chosen three exchange locations: Joe's Coffee House, ABC Books, and EFG Diner. As shown, Joe's Coffee House has sixty-five total items for sale and eleven items for sale matching User ABC's watch list. In an exemplary embodiment, the system 115 may provide the user with the ability to add new locations to the user's exchange locations by selecting exchange locations from the list of available exchange locations. The system 115 may also automatically add the entire set of exchange locations within a certain radius of the user's location. The location provided by the user may be in the form of a street address with city and state, a city and state only, a zip code, a telephone area code and central office exchange associated with the area, code (e.g., a NPA-NXX number, where NPA-NXX-XXXX is the format of a North American telephone number), longitude and latitude, or some other set of parameters used to define a physical location. Additionally, when adding an exchange location, the user may be given the option to specify that the location is "public", whereby the location is available to all other users to add to their list of exchange locations, or it may be marked as "private" and therefore only available to a subset of users such as the adding user's list of friends.

In an exemplary embodiment, if the user purchases an item at an exchange location that the user has not previously selected as an exchange location, the exchange location may be automatically added to the user's set of exchange locations. The user may also be allowed to select from other exchange locations in the area with similar characteristics (e.g., geographic characteristics, business-type characteristics, etc.) to the exchange location where the user purchased the item. System 115 may be configured to suggest exchange locations based on known information about the user, such as social network information, information about the user's interests, items for sale at other locations, information about the exchange locations already selected by the user and the geographic proximity of other nearby exchange locations, and so on. For example, if the system 115 maintains information concerning a network of friends of the user (e.g., as described in connection with FIG. 6 below), then the friends' exchange locations may be suggested as potential additional exchange locations for the user. For example, a user may be prompted to add an exchange location as follows: "Other members of your social network also exchange items at the XYZ exchange location. Would you like to add the XYZ exchange location as one of your preferred exchange locations?" Additionally, even if the user is not formally part of a social network, information about the user's interests may be used to suggest exchange locations. For example, if the user has a number of items relating to model trains in its watch list, and many users that have previously conducted transactions involving items related to model trains all have designated a particular exchange location, then that exchange location may be suggested as a potential additional exchange location for the user. For example, a user may be prompted to add an exchange location as follows: "Many users exchange model train items at the XYZ exchange location. Would you like to add the XYZ exchange location as one of your preferred exchange locations?" Exchange locations may also be suggested where a potential match between a buyer and seller exists but-for the that there is no overlap in preferred exchange locations. For example, a user may be prompted to add an exchange location as follows: "A person who is interested in purchasing your Widget item uses the XYZ exchange location. Would you like to add the XYZ exchange location as one of your preferred exchange locations?" As will be appreciated, the information described above may be used alone or in combination with other to suggest additional exchange locations.

In an exemplary embodiment, businesses may be provided with one or more screens which may be used to register as an exchange location. A notification may then be sent to the business to confirm the registration and to provide any other materials (e.g., a window sticker). Businesses may also be permitted to designate parameters under which they serve as exchange locations, such as only during certain specified hours (e.g., to encourage exchanges to take place during off-hours), only for certain categories of items (e.g., which fit the overall store format and customer base), and so on. Such information may be displayed to buyers and sellers and/or may be embodied in the form of business rules logic against which a particular proposed transaction may be assessed, as described above in connection with escrow service policies. System 115 may be configured such to use the information stored as business rules to make additional suggestions of exchange locations to the user in the manner generally described above. For example, if a business has indicated that it is only willing to serve as an exchange location in connection with a particular category of item, then messaging may be provided to users trying to buy or sell items within that category. For example, upon adding a model train item as an item for sale, a user may be prompted to add an exchange location as follows: "The XYZ exchange location focuses exclusively on exchanges related to model trains. Would you like to add the XYZ location as one of your preferred exchange locations?" In another exemplary embodiment, in addition to the default exchange locations, users may also be provided with the ability to add other exchange locations. For example, as described below in connection with FIG. 6, system 100 may be used by clubs (e.g., music appreciation clubs, book clubs, etc.) to facilitate the exchange of items between members of the club. In such a scenario, it may be desirable to permit club members to manually add information to define other exchange locations (e.g., members' homes, places of employment, and so on) in system 100.

Figure 3:
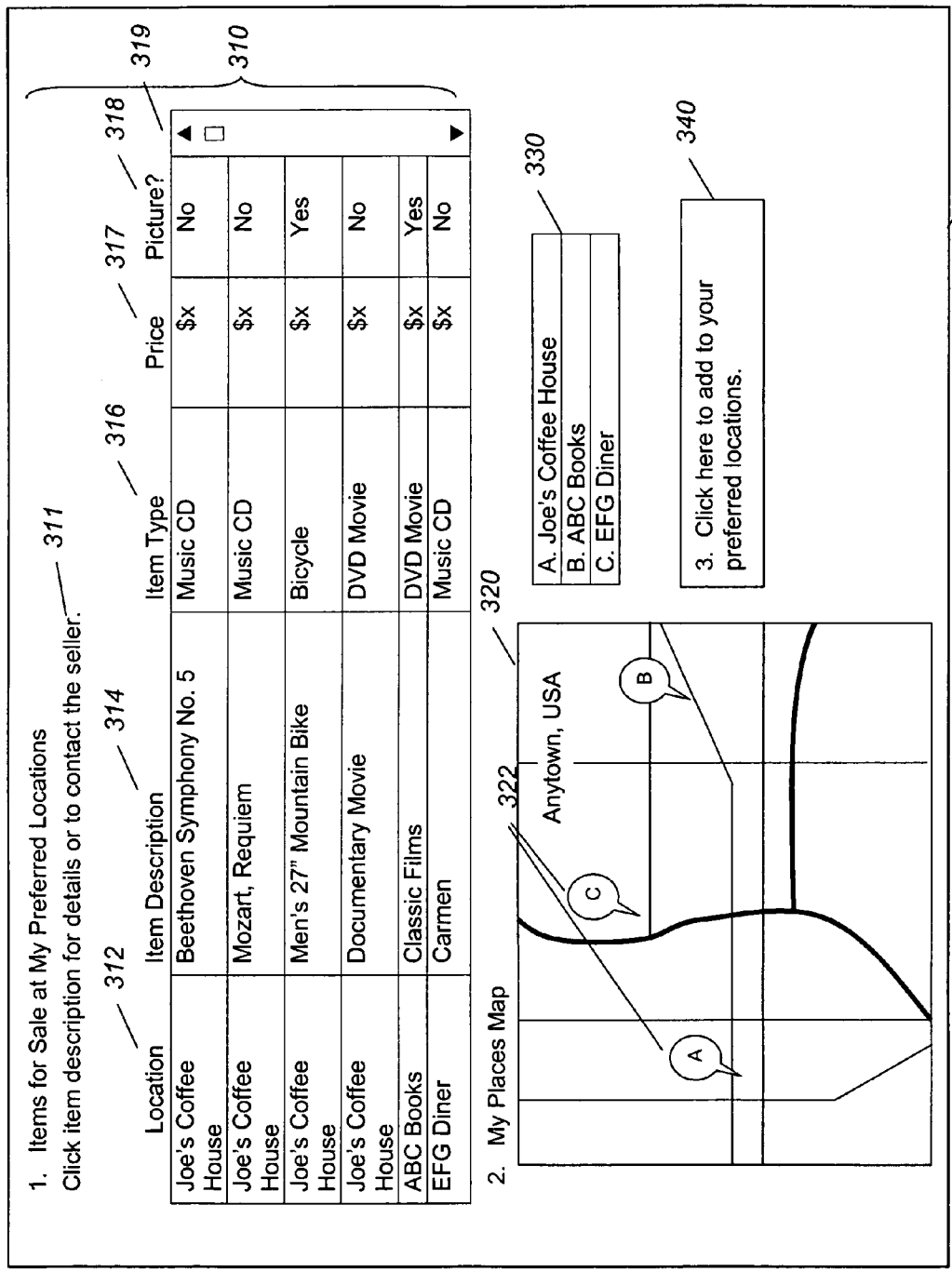
FIG. 3 is a screen display provided by the system of FIG. 1 in which a list of items available for sale at local exchange locations specified by a user is displayed.

FIG. 3 illustrates an exemplary interactive screen 300 which provides the user with a display of all items available at the user's exchange locations. Potential matches are identified by identifying exchange locations that are mutually agreeable to the user and to the sellers of the items, and by otherwise identifying items that fit the user's search criteria. In this example, the user is shown a list of items for all the user's exchange locations 310. The list shown includes an exchange location 312, an item description 314, an item type 316, a price for each item 317, and an indication of whether the selling user has included an image of the item 318. The list shown may include a scroll bar 319 which allows the user to move up or down through the entire list. As indicated in the list heading 311, the user may click on an item description to be presented with a screen containing the details for the item or in order to contact the seller.

In the illustrated example, the user is presented with a list of the items available for sale at Joe's Coffee House, ABC Books, and EFG Diner. Again, the user is presented with a geographic display 320 of the user's preferred local exchange locations, as indicated by the icons 322, along with a legend 330 indicating which icon represents which location. Finally, the user is given the ability to add more locations to the user's exchange locations using a button 340.

In an exemplary embodiment, the user may be able to filter the list of items available for sale based on characteristics such as item price or whether the item matches the user's watch list items. The user may also be provided with the ability to filter the list of items simply by clicking on an exchange location icon on the graphical display of the region.

In an exemplary embodiment, a user may receive notification of items available for sale at the user's designated exchange locations. For example, for the "watch items" in FIG. 2, and/or for items meeting specified filter criteria, system 100 may provide the user with notifications in the form of e-mails, text messages (e.g., short message service (SMS) messages), really simple syndication (RSS) feeds, or other type of notification at the time a new item is listed. Alternatively, notifications may be provided on a daily or on a scheduled basis (e.g., daily or weekly) for all items of interest to the user. The messages may include all newly available items, or may provide the user the ability to easily view the items available for sale via a customized Web page or an RSS feed. Other arrangements may also be used to notify users of items available for sale or exchange at the user's designated exchange locations.

In an exemplary embodiment, users may be provided with the ability to define multiple sets of exchange locations. For example, a user may be willing to travel further to make an exchange on a high value item than on a low value item. In this instance, the user may define a first set of exchange locations which is larger in geographic area (for high value items), and a second set of exchange locations which is smaller in geographic area (for low value items). As another example, a given user may wish to designate different groups of exchange locations depending on whether the user will be a buyer in a given transaction or a seller (e.g., a set of "buy" exchange locations and a set of "sell" exchange locations). In another exemplary embodiment, users may be provided with the ability to place time restrictions on exchange locations. For example, a user may stop at a certain coffee shop on the way to work each morning. In this instance, the user may be permitted to designate the coffee shop as an exchange location, with the further constraint that the user is only willing to conduct transactions at the coffee shop on weekdays between 8:00 AM and 9:00 AM. As another example, a given user may wish to designate different groups of exchange locations depending on the characteristics of items to be exchanged at the exchange locations, based on the users that use particular exchange locations, and/or based on other parameters.

In an exemplary embodiment, advertising may be displayed to the user in connection with the various interactive screens described herein, including screen 300. For example, the advertiser and/or the content of the advertisement may be selected based at least in part on the exchange locations selected by the user. For example, based on a knowledge of locations where the user frequently visits, advertisers and/or advertisements may be selected which are geographically relevant to the user (e.g., which advertise products or services that are near where the user frequently visits). Additionally, the advertiser and/or the content of the advertisement may be selected based on the items which the user has indicated the user would like to purchase (or would like to sell). For example, based on the items indicated by the user, advertisers and/or advertisements may be selected which advertise products or services that match the tastes or interests of the user.

Figure 4:
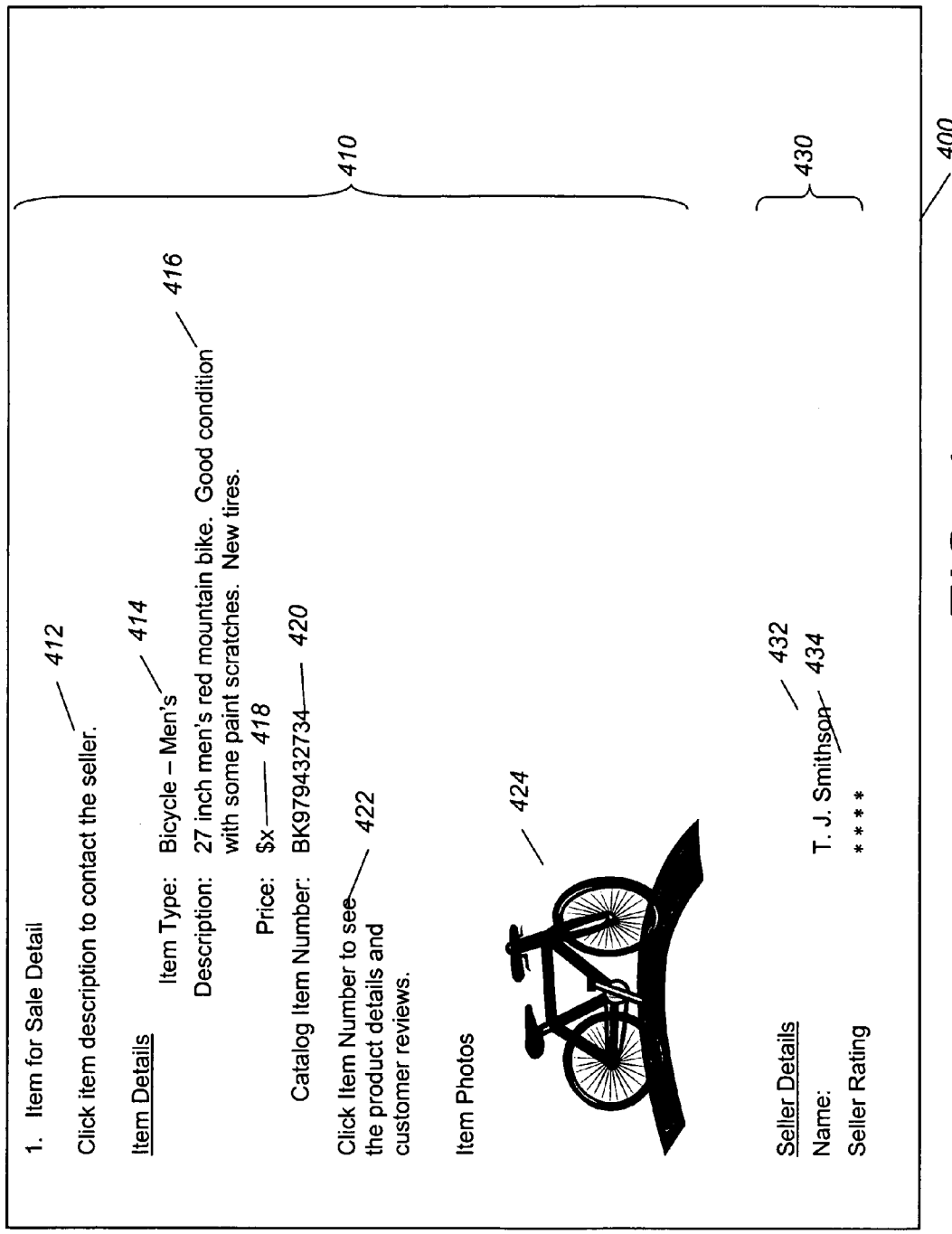
FIG. 4 is a screen display provided by the system of FIG. 1 in which details related to an individual item for sale are displayed.

FIG. 4 illustrates an exemplary interactive screen 400 displayed to a user showing the details of an item posted for sale. For example, the interactive screen 400 may be the offer detail page for a selected one of the items listed in FIG. 3 (e.g., the 27" mountain bike), and may be accessed by clicking on the selected item. The screen contains information relating to the item for sale in a region 410 and information relating to the seller in a region 430. The information related to the item for sale includes a heading 412 providing direction to the user, an item type in field 414, an item description in field 416, and an item price in field 418.

In FIG. 4; a catalog item number is provided in field 420 and instructions are provided in field 422 instructing the user that the user may click the catalog item number to view the information available in a product catalog related to the particular item. In an exemplary embodiment, a link to an electronic product catalog may be provided. For example, the electronic product catalog may be the catalog of an on-line retailer, that is, a retailer that offers items for sale via a website. The electronic product catalog may contain detailed product information for a variety of products, such as information from the producer of the products (e.g., manufacturer's information), product review information, information provided by customers (e.g., customer feedback information, customer reviews), product images, and so on. If the seller can find the item for sale in the electronic catalog, then the seller may be permitted to enter the product catalog number in field 422. This provides the potential purchaser with a vast amount of additional information concerning the item for sale and allows the purchaser to conduct a more complete evaluation of the item before taking the time to meet with the seller in person. Additionally, this allows the seller to utilize the electronic product catalog to quickly and accurately provide additional information concerning an item for sale, and alleviates or eliminates the need to for the seller to manually describe the item in detail.

In another exemplary embodiment, the user may be provided with the ability to dynamically build descriptions of those items not available in a product catalog. For example, a seller of a collectible model train who is not able to link to a product catalog containing a description of the item because of the train's rarity or age may instead manually create the description of the item. The system 115 may provide the ability for other users, primarily sellers or owners of identical model trains, to add or change the description of the item based upon their own knowledge and other information they may have available. For example, the wiki standard may be used, which allows users to add or edit Web-based content in a collaborative manner.

In some embodiments, the system may allow the seller to provide one or more images, a "slide show" in which a set of images are displayed, a video clip of the item, or some such other representation may be made available. For example, even if a link to a product catalog is provided, the seller may still wish to include such images in order to show the condition of the item. If the seller has provided any such images of the item, the image is displayed in region 424.

The information in region 430 related to the seller includes the seller's name 432 and the seller rating 434. The seller rating is an aggregate of the ratings supplied by other users of the system for this particular seller, along with the number of reviews upon which the rating is based. In some embodiments, the user may be able to choose to view additional details related to the seller, such as the seller's preferred local exchange locations, other items the seller currently has available for purchase, comments related to the seller from other users who have had dealings with the seller in the past, the seller's contact information, and so on.

In an exemplary embodiment, a link is provided which allows the user to notify the seller that the user is interested in purchasing the item. For example, the link may cause an e-mail or other electronic notification to be sent to the seller. The buyer and seller may then agree on a suitable time and place to meet (e.g., where multiple common exchange locations have been identified) and complete the transaction.

In an exemplary embodiment, the buyer may pay cash to complete the transaction. In another exemplary embodiment, the system 115 may allow the buyer to purchase the item from the seller by submitting a payment directly to the seller via an on-line transaction (e.g., a credit card or other form of electronic payment), thereby allowing the buyer to "reserve" the item and arrange to pick it up at a local exchange location without the need to bring cash, a check, or other item of payment for that transaction. Such an embodiment also allows the buyer to inspect the item upon receipt and may provide a method for allowing the buyer to refuse the item for some reason and receive a refund of the electronic payment.

Alternatively, payment may be submitted to a third-party intermediary. At the exchange location, if both sides agree to complete the transaction, then each party may transmit a respective electronic message (e.g., a numeric code transmitted by cell phone or other suitable handheld device) to the third-party intermediary to cause the third-party intermediary to release the payment to the seller and make the transaction final. Electronic confirmation may also be received from the third-party intermediary (e.g., again by cell phone or other suitable handheld device).

Figure 5:
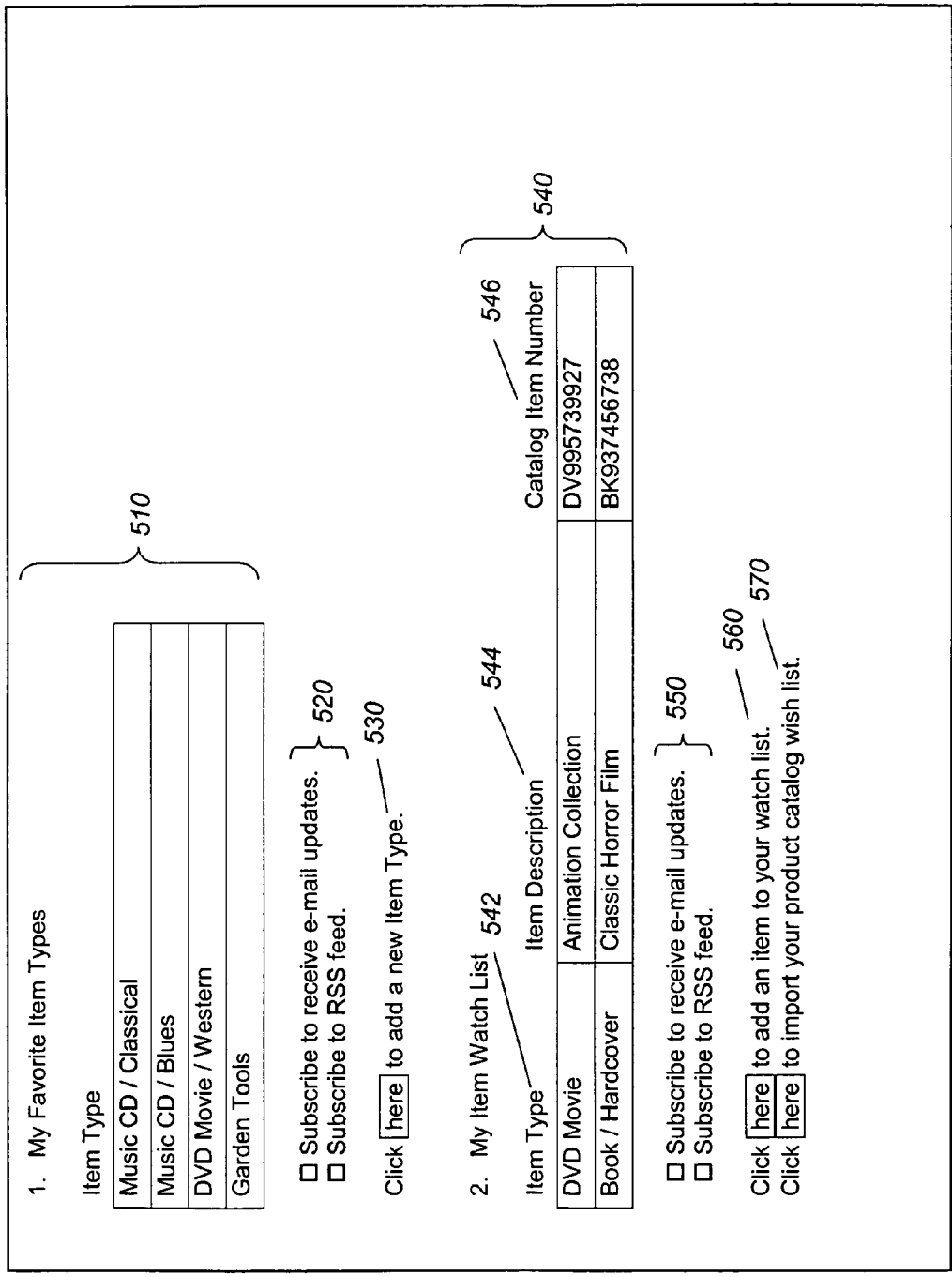
FIG. 5 is a screen display provided by the system of FIG. 1 in which a user's favorite categories of items and the specific items the user would like to purchase are displayed.

FIG. 5 is an exemplary interactive screen 500 displayed to a user to manage the user's favorite item types and item watch lists. The screen displays a list 510 of the user's favorite item types. The favorite item types may be used in other areas of the system 115 to narrow the available set of items presented for sale. For example, a given user may elect to view only hardcover books and sports memorabilia. In an exemplary embodiment, check boxes 520 are included to allow the user to subscribe to e-mail updates or an RSS feed notifying the user of any new items which meet the user's favorite item types and which are available at the user's exchange locations. The system 115 also allows the user to click a button 530 to add a new item type to the user's list 510 of favorite item types.

Screen 500 also includes an item watch list 540 which may be managed by the user and which contains those specific items the user is interested in purchasing. Similar to the favorite item types list 510, the item watch list 540 allows the user to restrict searches to those specific items contained on the list 540. The watch list 540 contains an item type field 542, an item description field 544, and a catalog item number field 546 if supplied by the user. If the user's watch items are identified by a product number from an electronic product catalog in field 546, the notifications that are sent to the user may be very specific. For example, a user may designate that it wishes to receive a text message whenever any one of a select group of music CDs becomes available, but otherwise does not wish to receive text message notifications.

The screen 500 also includes check boxes 550 to allow the user to subscribe to e-mail updates or an RSS feed listing all newly available items matching one of the user's watch list items. Other notification systems may be used to notify the user of additional items for sale either matching the user's favorite item types or the items on the user's watch list (e.g., a Web page display or SMS messaging). The user may add an item to the user's watch list 560, or may choose to import a wish list from a portion of a product catalog (e.g. wish list) from an on-line retail site using button 570, thereby adding the entire list from the on-line retail site to the user's watch list 540. This may also occur in reverse. For example, if an item is on a user's watch list 540, system 115 may be configured to generate a notification after a predetermined period of time has passed (e.g., six months) indicating that the item has not been found. The user may then be given an option to purchase the item on the on-line retail website. The fact that the item on the user's watch list has not become available may also be shared with the on-line retail website, for example, so that the on-line retail website may send the user notifications when the item of interest "goes on sale." Alternatively, if the item has not been found after a predetermined period of time has passed, the user may then also be notified of the existence of other exchange locations where the item is available, and may be prompted to add those exchange locations to the user's list of preferred exchange locations. As another example, in this situation, the user may be notified of the existence of relevant (but not matching) entries by other users. For example, if a potential buyer has included a widget in its watch list, but has specified that the widget must be in "top condition," the potential buyer may be notified of the existence of widgets for sale that are designated as being in "fair condition." As will be appreciated, various scoring algorithms may be used to assess the mutual relevance of entries of buyers and sellers based on any combination of the information provided by the buyers and sellers, and notifications may then be sent when the relevance score exceeds a predetermined threshold. Thus, for example, in addition to item condition, other factors that may be evaluated in the scoring algorithm to identify mutually relevant entries may include item price (e.g., where buy/sell offering prices do not match), geographic proximity of buyer/seller exchange locations (e.g., where there are no overlapping exchange locations), item similarity (e.g., where a perfect item match does not exist), and so on.

Figure 6:
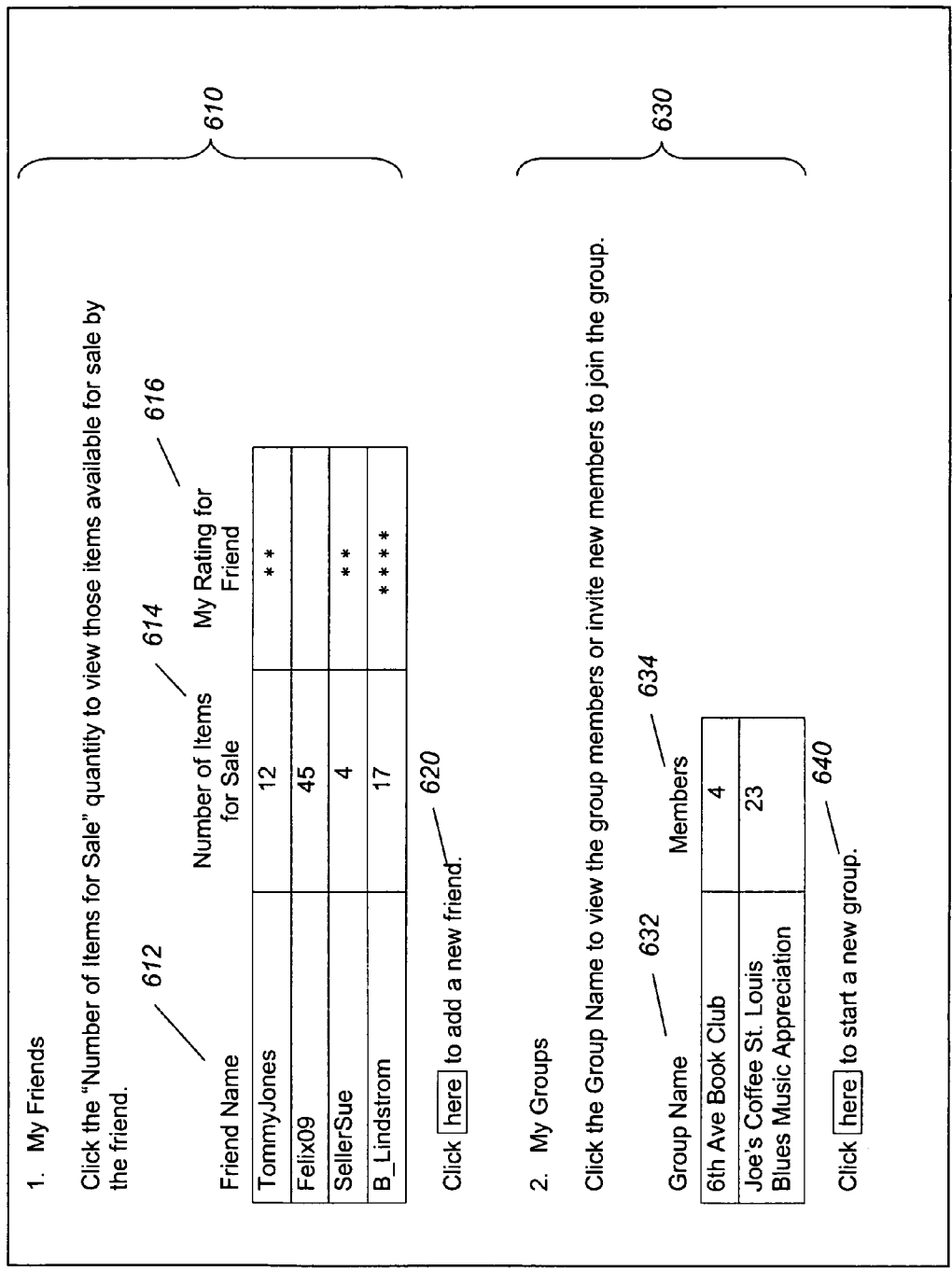
FIG. 6 is a screen display provided by the system of FIG. 1 in which a user's friends listing and groups listing are displayed.

FIG. 6 illustrates an example interactive screen 600 allowing a user to manage a list of other users that the user knows or with whom the user has had dealings in the past (e.g., the user's "friends"). The screen 600 displays a list of users designated as friends in a region 610. A "friend" may be any other user this particular user wishes to remember, such as a user with whom the user has conducted transactions or another user who has listed items in the past in which the user is interested. The screen 600 includes a column 612 to display the friend's name, a column 614 to display the number of items the friend has available for sale, and a column 616 to the user's rating for the friend. The user rating may be based upon the user's past experiences or other criteria as the user wishes. For example, the ratings may be provided in the form of a scale (e.g., one to four "stars," as shown in FIG. 6) or may be a simple positive or negative (e.g., "thumbs up" or "thumbs down") rating. In addition, the user is provided with the ability to click on a specific number in column 614 to view all those items available for sale by that particular friend.

In an exemplary embodiment, a region 630 is provided which allows the user to manage a set of groups of which the user is a member. The user is able to view the group names (column 632) and number of members of each group (column 634). By clicking on the group name, the user is able to view the list of members of that group or invite new members to join the group (e.g., if the user is designated as an "administrator" for that group for the system 115). A user may also press a button 640 to start a new group.

In another exemplary embodiment, the user is provided with the ability to view and maintain a network of friends. For example, the user may be provided with the ability to include other information about the friends (e.g., a photograph, contact information such as e-mail address or instant messenger name, or the friend's exchange locations). Also, the user may be provided with the ability to view the friends of friends, to do so through many iterations of contacts, and to see how those other users are related to the viewing user. For example, if user A knows user B, and user B knows user C, then user A may consider user C to be a more attractive exchange partner, since they both know user B. The user may also be automatically notified of any such mutual connections. The user may also be provided with the ability to view any ratings that B has given C (i.e., in addition to being able to view C's overall rating). For example, if A knows that B is a careful shopper, or that B does not ordinarily give high ratings to sellers, then a high rating from B may mean more to A than a high rating for C overall. The user may also be provided with the ability to contact those related friends if the user wishes to question them about past dealings with particular users, invite them to join a group, inquire about specific local exchange locations, or for some other reason. Also, the user may be provided with the ability to participate in Web-based discussions with other friends or members of a group, view which members of the group are currently "on line," or view other group members' items available for sale.

In another exemplary embodiment, screen 600 may be used to establish trading groups for goods among friends. For example, a neighborhood may establish a trading group for children's books, allowing the members of the group to list the books available by linking to a product catalog containing the book details. The members of the group may be provided with the ability to view all books available and exchanges may take place at a common exchange location, such as a member's home. Additional fields may be added to allow members of the group to schedule meetings for the group, to provide notes and comments related to the group or specific items, or to host a general discussion forum for the group. Members of the group may be provided with the ability to invite other users to become members, and users may be provided with the ability to search for groups in their area that are of interest to them.

FIG. 7 illustrates an exemplary interactive screen 700 allowing a user to view all items the user has made available for sale or add new items for sale. The items for sale are presented in the form of a list 710 which includes a description of each item (column 712), an item type (column 714), a catalog number for the item if the item has been linked to a product catalog (column 716), a price of the item (column 718), and whether the user has included additional pictures of the item (column 719). By clicking the item description, the user has the option of making changes to any of the item attributes or removing the item from the user's list of items available for sale.

Screen 700 also allows the user to add new items available for sale. In region 720, screen 700 provides a set of templates for the user to add details relating to items for sale. The user may begin by providing an item description (column 722) and selecting from a list of available item types (column 724). Alternatively, the user may instead click the catalog item number (column 726) to select the item from the product catalog and link the item for sale to the item on the product catalog. The system 115 may be configured to populate the description information (column 722) and item type information (column 724) for that item. In either case, the user then provides the item price (column 728) and may choose to add a picture of the specific item the user is making available for sale (column 729).

Screen 700 permits sellers to easily add an item to those available for sale by leveraging the item details already available in a product catalog (as also described above in connection with FIGS. 4-5). For example, a seller wishing to list a particular music CD may link to the item as listed in the product catalog, thereby allowing a potential buyer to easily view the information available in the product catalog such as the item description, editorial and user reviews, and sample audio tracks. The seller may also be provided with the option to add additional descriptive details, such as details describing the condition of the specific item for sale, images to help the potential buyer assess the item's condition or verify other details, and so on.

In an exemplary embodiment, the item may be automatically posted as a third-party item on the website of the on-line retailer associated with the product catalog after a certain amount of time has passed, thereby making the item available for sale in a larger geographic region. This allows the seller to appeal to a local audience first, and then to a broader audience if a sale is not made. In addition to or instead of being posted as a third-party item on the website of the on-line retailer, the item may also be posted in other on-line markets. For example, the item may be posted on an on-line auction website. As another example, the item may be posted on the website of an on-line classified advertising service. In another exemplary embodiment, the system 115 may be configured to track postings on such other on-line websites (e.g., using a web crawler), and to include items available on such other on-line websites in search results for specific items. Potential buyers may then perform filtering not only based on item and exchange location, but also based on the on-line markets at which items are available.

Figure 8:
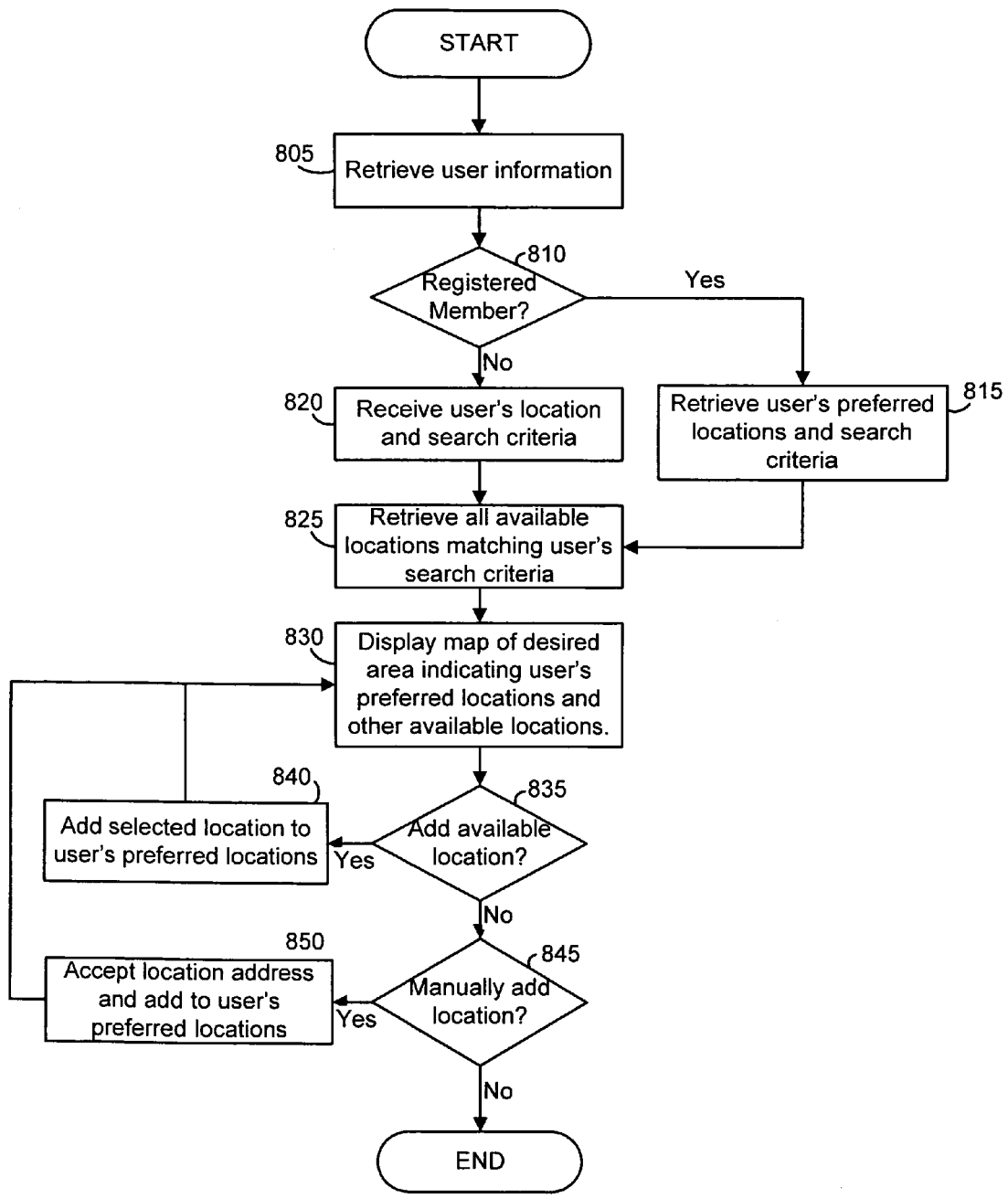
FIG. 8 is a flow chart of an exemplary process for allowing a user to specify his or her preferred local exchange locations.

FIG. 8 is a flow chart showing an exemplary process 800 for allowing a user to select favorite locations. The process 800 may, for example, be used as part of a registration procedure to permit the user to create a list of selected exchange locations, or later to permit the user to update a list of selected exchange locations.

The process 800 begins at step 805 where the information identifying the user is received. The process 800 continues to step 810 to determine whether the user has previously registered with the system and therefore may have a set of exchange locations selected earlier. If the user is a registered member, the process 800 continues to step 815 to retrieve the user's previously selected set of exchange locations and the user's search criteria for use in displaying other candidate locations. If the user is not a previously registered member as determined in step 810, the process 800 continues to step 820 where the user's location and search criteria are retrieved. For example, the user may be prompted to indicate the zip code in which the user resides and/or works. In some embodiments, the user's search criteria may include a radius from the user's location, type of exchange location, hours of operation of exchange location and/or whether the exchange location acts as an escrow agent.

After retrieving the user's search criteria, either from the registered user's information in step 815 or a new user's information in step 820; the process 800 continues to step 825 where the system 115 retrieves the registered exchange locations matching the parameters defined by the user's location and search criteria. After retrieving the set of available locations, the process 800 continues to step 830 where a map of the user's local area is displayed. The map may comprise icons indicating the location of each of the user's exchange locations as well as icons depicting the location of other available exchange locations which the user may choose to add to the user's exchange locations. Displayed alongside the map is a map legend indicating the name of each location as it relates to the map icons. In some embodiments, the display may include such features as indicators on the map of the number of items available at each location, the ability to view driving directions to the various exchange locations, an indication of whether an exchange location also serves as an escrow agent for a sale, and so on.

The process 800 continues to step 835 where the user may optionally select an available location to add to the user's set of preferred locations. The user may do so, for example, by clicking on the location icon on the map or the location name on the map legend. If the user selects a location to add to the user's exchange locations, the process 800 branches to step 840, where the system 115 adds the selected location as desired. The process 800 then returns to step 830 where the map of locations is displayed, this time including the newly added exchange location. If the user does not choose to add a new available location during the first or a subsequent iteration of step 835, the system continues to step 845 to determine whether the user wishes to manually add an exchange location not currently available in the set of available locations. If the user chooses to manually add a location, the process 800 branches to step 850 where the details regarding the new location are captured. In some embodiments, the location details may include descriptive items such as the street address, type of location (e.g., retail business, residence, place of work, coffee shop or café), and hours of operation. Also, in some embodiments, the process 800 may validate the added location for address validity or a match against a database of known businesses, residences, etc. If a new location is added manually, the process 800 again returns to step 830 and displays the map, the user's preferred location, and available locations, along with the new, manually added location. If a new location is not manually added in step 845 then the process 800 terminates.

As previously noted, in an exemplary embodiment, users may be provided with the ability to define multiple sets of exchange locations. For example, a user may designate different sets of preferred exchange locations based on the value of the item to be purchased/sold, based on whether the user will be a buyer or seller in a given transaction, based on the time of day of the proposed transaction, and/or based on other criteria. As will be appreciated, the screens presented to the user during the process 800 may include fields to prompt the user to provide information useable to define such different groups of exchange locations.

Figure 9:
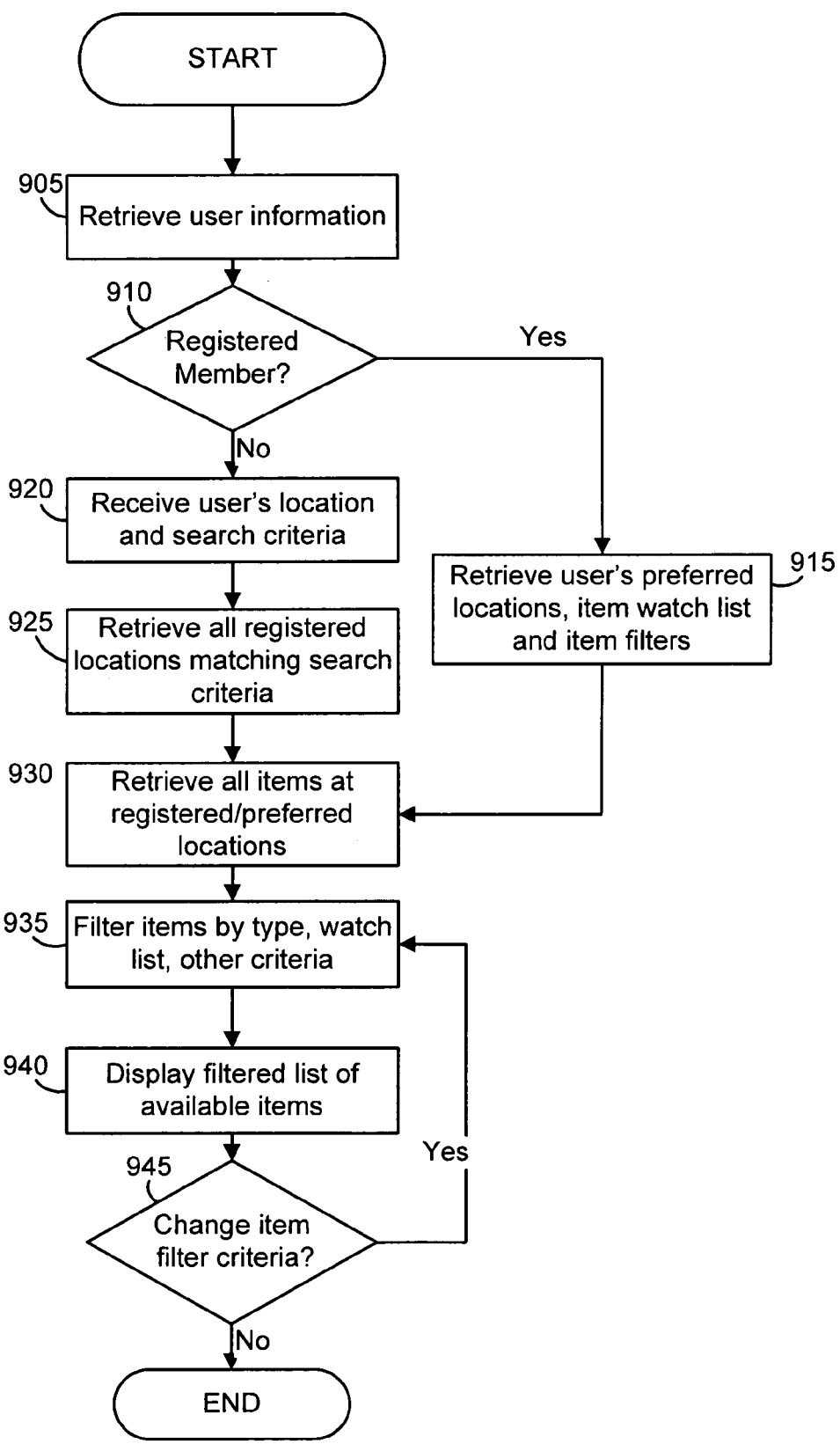
FIG. 9 is a flow chart of an exemplary process for displaying all items for sale at a user's preferred local exchange locations and that match the user's search criteria.

FIG. 9 is a flow chart showing a process 900 to display all available items for sale at a user's exchange locations. The process 900 displays a list of all items available at the set of exchange locations selected by the user or matching the user's search criteria.

The process 900 begins at step 905 where the information identifying the user is retrieved. The process 900 continues to step 910 to determine whether the user has previously registered with the system and therefore may have a defined set of exchange locations. If the user is a registered member, the process 900 continues to step 915 to retrieve the user's previously selected set of exchange locations and the user's search criteria for use in displaying other candidate locations. If the user is not a previously registered member as determined in step 910, the process 900 instead continues to step 920 where the user's location and search criteria are retrieved. The process 900 continues to step 925 where the system retrieves the set of exchange locations matching the parameters defined by the user's location and search criteria. After retrieving the set of locations, either for a registered user in step 915 or for a new user in step 925, the process 900 continues to step 930 where the list of all items available for sale at the defined set of locations is retrieved. The process 900 continues with step 935 where the list of available items is filtered based upon the user's predefined preferences, if a registered user, or the filter criteria provided by the user at the time of the execution of the process 900. In the illustrated example, the user is provided with the ability to filter the available items by item type, the registered user's watch list, or other criteria. The user may also be provided with the ability to filter by other criteria such as item price, item condition, whether an image of the item is available, the seller name or the seller rating.

The process 900 continues to step 940 where the system displays the resulting, filtered list of items available for sale at the defined locations. Some embodiments may include the display of details such as the item description, a user-provided item image, item price, seller name, and seller rating. The process 900 then continues with step 945 where the user may choose to change the filter criteria. If the user changes the filter criteria, the process 900 branches back to step 935 wherein the full set of results retrieved earlier is again filtered according to the user's chosen criteria, then the process 900 continues with step 940 where the new filtered results are displayed. Finally, the process 900 continues again to step 945 where the user may choose to apply another set of filter criteria. If the user does not choose to apply a new set of filter criteria, then process 900 terminates.

Figure 10:
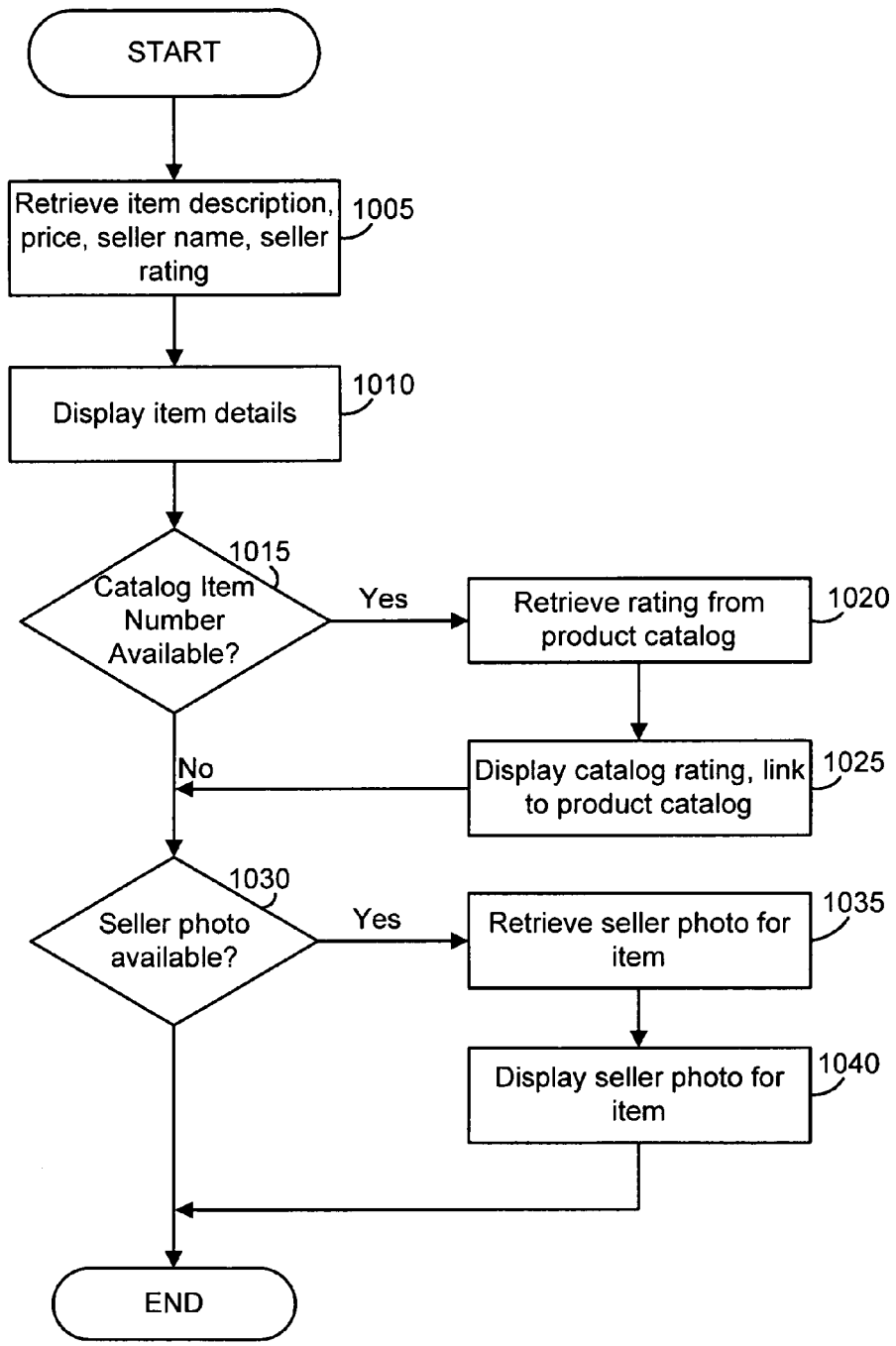
FIG. 10 is a flow chart of an exemplary process for displaying the detailed information related to an item for sale or exchange, including a link to a product catalog and a photograph provided by the seller.

FIG. 10 is a flow chart showing a process 1000 used to display the detailed information related to an item available for sale selected by the user. The process 1000 begins at step 1005 where the information related to the item for sale is retrieved. In this example, the information includes the item description, item price, seller name, and seller rating. The item information may also include other information, such as the set of exchange locations where the seller is willing to complete the sale, payment options available, and links to other items available from the seller.

The process 1000 continues to step 1010 where the information retrieved in step 1005 is displayed. The process 1000 then continues to step 1015 to determine whether a catalog item number has been provided by the seller. The presence of a catalog item number indicates that the seller has identified an identical item available in a product catalog and has provided a hyperlink to that item on the product catalog Website. If the catalog item number is available, the process 1000 branches to step 1020 where the details from the product catalog related to the item are retrieved. In the illustrated example, the aggregate rating for the item in the product catalog is retrieved as well as the information necessary to provide the user a link directly to the item on the website of the on-line retailer associated with the product catalog. Other information may also be retrieved, such as the catalog price, editorial or user reviews, images of the item, hyperlinks to related items and audio samples. The process 1000 continues to step 1025 where the information retrieved from the product catalog is displayed. If no catalog item number has been provided by the seller, or after the catalog item information is retrieved and displayed, the process 1000 continues to step 1030 where the presence of a seller-supplied photograph is determined. If the seller has provided a photograph, the process 1000 branches to step 1035 where the photograph is retrieved. The process 1000 then continues to step 1040 where the photograph is displayed. If no photograph is provided, or the photograph has been provided and displayed, the process 1000 then terminates.

Those skilled in the art will also appreciate that the sample screens discussed above may be structured in different manners, with information added or removed, with information displayed on more screens or fewer screens, and with the interaction between various screens implemented in different manners. The data structures supporting the screens may also be structured in a different manner and contain more or less information than depicted.

It should be noted that although flow charts may be provided herein to show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps, and decision steps. It should also be rioted that the word "component" as used herein and in the claims is intended to encompass implementations using one or more lines of software code, and/or hardware implementations, and/or equipment for receiving manual inputs. It is to be understood that any method steps as recited herein (e.g., in the claims) may be performed by a configuration utility (e.g., Java™-based) executed by a computing device based on input by a user. Of course, according to various alternative embodiments, any suitable configuration utility, application, system, computing device, etc. may be used to execute, implement and/or perform method steps as recited in this disclosure (including the claims).

The invention is described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems, and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machine to perform a certain function or group of functions.

Embodiments of the invention have been described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components, including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules, and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented method for facilitating exchanges of items, comprising:

receiving information from users who are potential sellers of items such that, for each potential seller, the information includes an indication of an item that the potential seller desires to sell and a selection of one or more exchange locations at which the potential seller is willing to meet with prospective buyer users to provide the item, the one or more exchange locations selected by the potential seller each being a publicly accessible location that is not a retail business selling the item indicated by the potential seller;

receiving information from users who are potential buyers of items such that, for each potential buyer, the information includes an indication of a type of item that the potential buyer desires to purchase and a selection of one or more exchange locations at which the potential buyer is willing to meet with prospective seller users to receive an item of the indicated type, the one or more exchange locations selected by the potential buyer each being a publicly accessible location that is not a retail business selling the type of item indicated by the potential buyer;

under control of one or more configured computing systems, and after the receiving of the information from the users who are the potential sellers and the receiving of the information from the users who are the potential buyers, automatically analyzing the information received from the potential sellers and from the potential buyers to identify potential matches between the potential buyers and the potential sellers, the potential matches each including one of the potential sellers and one of the potential buyers and being identified at least in part by identifying an exchange location that was previously selected by both the one potential buyer and the one potential seller; and for each of the identified potential matches, notifying the one potential seller and the one potential buyer for the identified potential match of the identified exchange location that was selected by both the one potential buyer and the one potential seller, so as to facilitate a potential purchase at the identified exchange location by the one potential buyer of the item indicated by the one potential seller.

2. The method of claim 1 further comprising, after the receiving of the information from one of the potential buyer users of the indicated type of item that the one potential buyer desires to purchase and of the selected one or more exchange locations at which the one potential buyer is willing to meet with prospective seller users, providing the one potential buyer with information concerning items available at those selected one or more exchange locations from one or more of the potential sellers, the one or more potential sellers being willing to meet at those selected one or more exchange locations of the one potential buyer, the provided information being based at least in part on filter criteria defined by the one potential buyer.

3. The method of claim 2, wherein the providing of the information to the one potential buyer includes providing the one potential buyer with an interactive screen display showing, for each of at least one of the selected one or more exchange locations at which the one potential buyer is willing to meet with prospective seller users, indications of at least some of the items available at that selected exchange location from the one or more potential sellers.

4. The method of claim 1 further comprising, after the receiving of the information from one of the potential seller users of the indicated item that the one potential seller desires to sell and of the selected one or more exchange locations at which the one potential seller is willing to meet with prospective buyer users, providing the one potential seller with information concerning types of items that one or more of the potential buyers desire to purchase, the one or more potential buyers being willing to meet at the selected one or more exchange locations of the one potential seller, the provided information being based at least in part on filter criteria defined by the one potential seller.

5. The method of claim 4, wherein the providing of the information to the one potential seller includes providing the one potential seller with an interactive screen display showing, for each of at least one of the selected one or more exchange locations at which the one potential seller is willing to meet with prospective buyer users, indications of at least some of the types of items that one or more of the potential buyers desire to purchase, the one or more potential buyers being willing to meet at the selected one or more exchange locations of the one potential seller.

6. The method of claim 1 wherein, for each of at least one of the potential buyers, the one or more exchange locations at which the potential buyer is willing to meet with prospective seller users are selected by the potential buyer from a default list of exchange locations provided to the potential buyer.

7. The method of claim 6 further comprising, for each of the at least one potential buyers, displaying a map of the exchange locations from the default list to the potential buyer to enable selection by the potential buyer of the selected one or more exchange locations of the potential buyer.

8. The method of claim 7, wherein the map includes icons indicating geographic locations of the exchange locations from the default list.

9. The method of claim 6 further comprising, for each of the at least one potential buyers, identifying exchange locations from the default list that have business-type attributes similar to other exchange locations previously selected by the potential buyer.

10. The method of claim 1 wherein the indication of the type of item desired to be purchased by one of the potential buyers includes an indication of one or more categories of items, each category including multiple distinct items.

11. The method of claim 1 wherein the one or more configured computing systems are operated on behalf of an electronic marketplace, and wherein the method further comprises providing one of the potential buyers with information concerning the indicated item that one of the potential sellers desires to sell, the provided information including information obtained from an on-line product catalog of an on-line retailer that is distinct from the electronic marketplace.

12. The method of claim 11, wherein the included information obtained from the on-line product catalog includes customer review information for the indicated item of the one potential seller.

13. The method of claim 1 wherein the one or more configured computing systems are operated on behalf of an electronic marketplace, and wherein the method further comprises receiving a product catalog number from one of the potential sellers, the product catalog number being received in connection with the indicated item that the one potential seller desires to sell and relating to a corresponding item available in a product catalog of an on-line retailer that is distinct from the electronic marketplace, the product catalog number being associated with item details including at least one of a description, images, and review information for the indicated item that the one potential seller desires to sell, and wherein the item details are made available to one or more of the potential buyers.

14. The method of claim 1 wherein the one or more configured computing systems are operated on behalf of an electronic marketplace, and wherein, for one of the potential buyers, the indication of the type of item that the one potential buyer desires to purchase includes an item imported from a wish list maintained for the one potential buyer by an online retail website that is distinct from the electronic marketplace.

15. The method of claim 1 wherein the one or more configured computing systems are operated on behalf of an electronic marketplace, and wherein, for one of the potential buyers, a notification is provided after a predetermined period of time in which no match has been found for the indicated type of item that the one potential buyer desires to purchase, the notification including a prompt for the one potential buyer to purchase an item of the indicated type on a retail website that is distinct from the electronic marketplace.

16. The method of claim 1 wherein the potential buyers and the potential sellers are grouped into friend networks, and wherein the method further comprises providing one of the potential buyers with information concerning a common friend shared by the one potential buyer and one of the potential sellers based on one of the friend networks.

17. The method of claim 1 further comprising notifying one of the potential buyers of a newly available item that is available at one or more of the selected exchange locations at which the one potential buyer is willing to meet with prospective seller users and that satisfies other filter criteria defined by the one potential buyer.

18. The method of claim 17, wherein the notifying includes sending at least one of a text message and an electronic mail message.

19. The method of claim 1 wherein a first exchange location is part of a business that sponsors the first exchange location, and wherein the method further comprises indicating that the business is sponsoring the first exchange location.

20. The method of claim 1, wherein a first exchange location acts as an escrow service for sale of an item from a potential seller by keeping the item at the exchange location and allowing a potential buyer to purchase the item at the exchange location without the potential seller of the item being physically present at the first exchange location during the purchase of the item.

21. The method of claim 1, wherein the potential buyers are able to pay for items electronically and thereafter arrange for pickup of the items at exchange locations.

22. The method of claim 1 wherein one of the identified potential matches results in a transaction that has an associated transaction fee, the transaction involving the sale of indicated item from the one potential seller for the identified potential match to the one potential buyer for the identified potential match.

23. The method of claim 22, wherein the transaction fee is charged as a percentage of a total value of the transaction and is charged contingent upon completion of the transaction.

24. The method of claim 22, wherein the transaction fee is charged by a business entity that is the identified exchange location for the identified potential match at which the transaction occurs.

25. The method of claim 22, wherein the transaction fee is charged by a business entity that serves as an escrow service for the indicated item in connection with the transaction.

26. The method of claim 22, wherein the transaction fee is a fee charged to the one potential seller for the one identified potential match.

27. The method of claim 1 wherein, for each of at least one of the potential sellers, the indicated item that the potential seller desires to sell is a second-hand item.

28. The method of claim 1 wherein, for each of at least one of the identified potential matches, the identified exchange location of the identified potential match is a health club.

29. The method of claim 1 wherein, for each of at least one of the identified potential matches, the identified exchange location of the identified potential match is a school.

30. The method of claim 1 wherein, for each of at least one of the identified potential matches, the identified exchange location of the identified potential match is a coffee shop.

31. The method of claim 1 wherein, for each of at least one of the identified potential matches, the identified exchange location of the identified potential match is a book store.

32. A computer-implemented data processing system for facilitating exchanges of items, comprising:
a processing unit; and
a storage device coupled to the processing unit and having information stored therein for configuring the processing unit to:

receive information from users who are potential sellers of items such that, for each potential seller, the information includes an indication of an item that the potential seller desires to sell and a selection of one or more exchange locations at which the potential seller is willing to meet with prospective buyer users to provide the item, the one or more exchange locations selected by the potential seller each being a publicly accessible location that is not a retail business selling the item indicated by the potential seller;

receive information from users who are potential buyers of items such that, for each potential buyer, the information includes an indication of a type of item that the potential buyer desires to purchase and a selection of one or more exchange locations at which the potential buyer is willing to meet with prospective seller users to receive an item of the indicated type, the one or more exchange locations selected by the potential buyer each being a publicly accessible location that is not a retail business selling the type of item indicated by the potential buyer;

after the receiving of the information from the users who are the potential sellers and the receiving of the information from the users who are the potential buyers, automatically analyze the information received from the potential sellers and from the potential buyers to identify potential matches between the potential buyers and the potential sellers, the potential matches each including one of the potential sellers and one of the potential buyers and being identified at least in part by identifying an exchange location that was previously selected by both the one potential buyer and the one potential seller; and for each of the identified potential matches, notify the one potential seller and the one potential buyer for the identified potential match of the identified exchange location that was selected by both the one potential buyer and the one potential seller, to facilitate a potential purchase at the identified exchange location by the one potential buyer of the item indicated by the one potential seller.

33. The system of claim 32, wherein the storage device further has information stored therein for configuring the processing unit to provide one of the potential buyers with information concerning items available at one or more of the exchange locations for purchase from one or more of the potential sellers, the provided information being based at least in part on filter criteria defined by the one potential buyer.

34. The system of claim 32, wherein the storage device further has information stored therein for configuring the processing unit to provide one of the potential sellers with information concerning one or more watch list items that one or more of the potential buyers desire to purchase at one or more of the exchange locations, the provided information being based at least in part on filter criteria defined by the one potential seller.

35. The system of claim 32, wherein the storage device further has information stored therein for configuring the processing unit to cause a map of the exchange locations selected by one or more of the potential buyers to be displayed to one or more of the potential sellers.

36. The system of claim 35, wherein the map comprises icons indicating locations of the exchange locations selected by the one or more potential buyers.

37. The system of claim 32, wherein the storage device further has information stored therein for configuring the processing unit to provide at least one of the potential buyers with information concerning at least one item desired to be sold by at least one of the potential sellers, and wherein the information provided to the at least one potential buyer includes information obtained from an on-line product catalog of an on-line retailer.

38. The system of claim 37, wherein the on-line product catalog comprises customer review information for the at least one items.

39. The system of claim 32, wherein the storage device further has information stored therein for configuring the processing unit to receive a product catalog number for a product catalog from one of the potential sellers, the product catalog number being received in connection with a first item that the one potential seller desires to sell and being associated an item that is available in the product catalog, the product catalog number enabling one of the potential buyers to view information in the product catalog related to the associated item in the product catalog, and wherein the information in the product catalog includes a description, images, and review information and is made available to one or more of the potential sellers.

40. The system of claim 32 wherein the data processing system is operated on behalf of an electronic marketplace, and wherein, for one of the potential buyers, a notification is provided after a predetermined period of time in which no match has been found for the indicated type of item that the one potential buyer desires to purchase, the notification including a prompt for the one potential buyer to purchase an item of the indicated type on from an online retailer distinct from the electronic marketplace.

41. The system of claim 32 wherein one of the identified potential matches results in a transaction that has an associated transaction fee, the transaction involving the sale of the indicated item from the one potential seller for the identified potential match to the one potential buyer for the identified potential match, and wherein the storage device further has information stored therein for configuring the processing unit to collect the associated transaction fee.

42. The system of claim 41 wherein the transaction fee is charged by at least one of a business entity that is the identified exchange location for the identified potential match at which the transaction occurs and a business entity that serves as an escrow service for the indicated item in connection with the transaction.

43. The system of claim 32 wherein, for each of at least one of the potential sellers, the indicated item that the potential seller desires to sell is a second-hand item, and wherein the identified exchange locations of the identified potential matches are each at least one of a health club, a school, a coffee shop, and a book store.

* * * * *